United States Patent
Friedlander et al.

(10) Patent No.: US 6,760,568 B2
(45) Date of Patent: Jul. 6, 2004

(54) CIRCUIT AND METHOD FOR REDUCING LOCAL OSCILLATOR FREQUENCY TRANSMISSION IN A RADIO TRANSCEIVER

(75) Inventors: Haim Friedlander, Rehovot (IL); Gadi Shirazi, Ramat-Gan (IL); Jon Dellon, Moshav Magshimim (IL)

(73) Assignee: Motorola, Inc., Schaumburg, IL (US)

( * ) Notice: Subject to any disclaimer, the term of this patent is extended or adjusted under 35 U.S.C. 154(b) by 610 days.

(21) Appl. No.: 09/851,046

(22) Filed: May 8, 2001

(65) Prior Publication Data

US 2001/0053671 A1 Dec. 20, 2001

(30) Foreign Application Priority Data

Jun. 14, 2000 (GB) .............................................. 0014590

(51) Int. Cl.⁷ ................................................ H04B 1/44
(52) U.S. Cl. ............................ 455/78; 455/82; 455/84; 455/86
(58) Field of Search ............................ 455/63.1, 67.13, 455/76, 78, 83, 86, 107, 202, 210, 82, 84

(56) References Cited

U.S. PATENT DOCUMENTS

| 5,768,690 A | * | 6/1998 | Yamada et al. ................ 455/78 |
| 5,896,562 A | * | 4/1999 | Heinonen ..................... 455/76 |
| 5,933,767 A | * | 8/1999 | Leizerovich et al. ........ 455/126 |
| 6,311,045 B1 | * | 10/2001 | Domokos ..................... 455/78 |
| 6,625,424 B1 | * | 9/2003 | Mohindra ..................... 455/84 |

FOREIGN PATENT DOCUMENTS

| EP | 661 801 A1 | 7/1995 | |
| JP | 09261141 | * 10/1997 | ............ H04B/7/02 |

* cited by examiner

Primary Examiner—Vivian Chin
Assistant Examiner—Tuan Tran
(74) Attorney, Agent, or Firm—Steven R. Santema; Valerie M. Davis

(57) ABSTRACT

A circuit and method for reducing local oscillator frequency transmission in a homodyne, or direct conversion, radio transceiver using I/Q modulation/demodulation minimizes local oscillator leakage to the antenna and its subsequent reception by the receiver by interfacing I/Q input signals to the modulator in a controlled manner so as to increase isolation during reception by presenting high impedance states to the I/Q modulator input terminals during reception thereby nulling the carrier during reception.

22 Claims, 1 Drawing Sheet

CIRCUIT AND METHOD FOR REDUCING LOCAL OSCILLATOR FREQUENCY TRANSMISSION IN A RADIO TRANSCEIVER

FIELD OF THE INVENTION

This invention relates to local oscillator frequency transmission in a radio transceiver. In such a transceiver, a local oscillator (LO) frequency signal is used for modulation to produce modulated signals for transmission.

BACKGROUND OF THE INVENTION

In a particular type of homodyne transceiver, an I/Q (in-phase and quadrature-phase, respectively) modulator is used. A possible application for use of such a transceiver requires the transmission of two pulses of 1 µs duration of different phases 1 µs apart and then repeating after 100 µs. The pulses are transmitted onto material that responds with a signal (echo) 600 KHz less than the transmitted frequency. The echo is received 4 µs after the second pulse is transmitted. In practice, the echo may be almost completely covered by noise. By using a combination of different phases in the transmitted signal, this additive noise can be almost completely removed.

The unwanted emission during reception mode of local oscillator (LO) frequency out through the antenna or internally, e.g. via an antenna switch, and the subsequent reception of it by the receiver is a problem in homodyne or direct conversion transceivers. It is a problem which increases with ever-decreasing levels of received signal strength in the receiver. Where signal levels are even lower than normal, the receiver is very sensitive to in-band signals. This LO leakage can cause a DC offset in the receiver, which distorts the information contained in the received signal.

Typically, I/Q modulators have two pairs of differential input pins: one pair for the In-Phase (I) modulation signal input, and an additional pair for the Quadrature (Q) phase modulation input. These pins are internally biased so as to provide maximum carrier suppression with no signal applied.

It is common practice for input signals to be AC-coupled to the I and Q input pins to the modulator. The reason for this is that any DC voltage appearing at the inputs would cause DC offsets within the device, which in turn would degrade the carrier suppression of the modulated signal. For most applications, AC coupling would be suitable, provided that the DC-blocking capacitor value is chosen such that the high-pass corner frequency that results from this type of coupling is low enough to avoid any distortion of the modulating signal.

For some applications, however, the modulating signal must be DC coupled to the modulator inputs. In one application such as that described above, the phase of the transmitted signal must be one of four fixed, stable values for the duration of the transmitted pulse, and must be repeatable from pulse to pulse. This requirement can be fulfilled only if the phase-control signals are DC-coupled to the I and Q input pins to the modulator. To overcome the inherent DC offsets that would be introduced in such an application, and to reduce the resulting carrier leakage during reception, complex DC offset compensation circuitry would heretofore be necessary.

It is an object of the present invention to provide a circuit and method for reducing local oscillator frequency transmission in a radio transceiver wherein the above mentioned disadvantage(s) may be alleviated.

SUMMARY OF THE INVENTION

In accordance with a first aspect of the invention there is provided a circuit for reducing local oscillator or carrier frequency transmission in a radio transceiver, the circuit comprising: modulator means or circuitry having inputs for receiving signals for modulation on a carrier signal to produce a modulated carrier transmission signal for transmission; and demodulator circuitry for receiving a modulated carrier reception signal to recover therefrom signals modulated thereon, wherein the circuit further comprises control means or circuitry for applying to the modulator circuitry inputs the signals for modulation on the carrier during transmission and for presenting to the inputs of the modulator circuitry high impedances during reception whereby carrier frequency transmission during reception is reduced.

DESCRIPTION OF THE INVENTION

In this transceiver, the solution to the DC offset problem caused by LO leakage discussed above is to suppress the carrier during reception by way of high impedance states presented on modulation signal inputs, e.g. I and Q inputs, of an I/Q modulator. The phase of the output signal of a modulator which is an I/Q modulator may be controlled during transmission by inputs on the I and Q (modulation signal input) lines. Preferably, by internally biasing the I/Q lines, maximum LO isolation can be provided by nulling the carrier. This condition can by the invention be obtained during reception by the high impedance states provided by the control means. The invention thereby beneficially allows the transceiver to use inexpensive integrated circuits (IC's), which are currently widely available in the marketplace.

Thus, in the circuit according to the first aspect of the invention, the control means and modulation means may be such that the modulation signals may be phase control signals, e.g. in-phase and quadrature phase signals, which are dc coupled to the modulator means via the modulation signal inputs. The signals may be applied as differential signals via pairs of inputs to the modulator means, e.g. to provide transmitted modulated signals which have one of four selected phase states.

In the circuit according to the first aspect of the invention, the modulation means may comprise means for internally biasing the modulation signal inputs whereby the carrier signal is suppressed with no modulation signal applied. The carrier signal may by the provision of the control means, be substantially nulled during reception.

The control means may incorporate semiconductor switching devices which can be switched between a conducting state and a high impedance state. The switching devices may comprise transistor devices, e.g. bipolar transistors.

The circuit according to the first aspect of the invention may include control circuitry which comprises: outputs for connection to the inputs of the modulator circuitry; and high impedance transistor circuitry; the inputs of the modulator circuitry being connected to the outputs of the control circuitry to receive the signals for modulation on the carrier during transmission, and the high impedance transistor circuitry being coupled to the inputs of the modulator circuitry to present a high impedance thereto during reception.

The invention beneficially allows one frequency synthesiser to be used as the source for both the transmitter and the receiver and for the transmitter and receiver to operate in the same frequency band without substantial feedthrough of the carrier signal during reception.

The transceiver according to the first aspect of the invention may be a homodyne transceiver and may be usable in a mobile or portable radio communications device.

In accordance with a second aspect of the invention there is provided a method for reducing carrier frequency transmission in a radio transceiver which method comprises providing modulator circuitry having inputs receiving signals for modulation on a carrier and producing a modulated carrier transmission signal for transmission; providing demodulator circuitry receiving a modulated carrier reception signal and recovering therefrom signals modulated thereon; and providing control circuitry applying to the modulator circuitry inputs the signals for modulation on the carrier during transmission and presenting to the inputs of the modulator circuitry high impedances during reception whereby carrier frequency transmission is reduced.

EP0661801A describes a quadrature phase modulator for a transmitter with adaptive suppression of carrier leakage. This reference describes a technique for nulling the carrier feedthrough during modulation for transmission. It does not contemplate reducing unwanted carrier leakage between transmissions, i.e. during a reception mode, as provided by the present invention.

Embodiments of the present invention will now be described by way of example with reference to the accompanying drawings.

DESCRIPTION OF DETAILED EMBODIMENT(S) OF THE INVENTION

Figure 1:
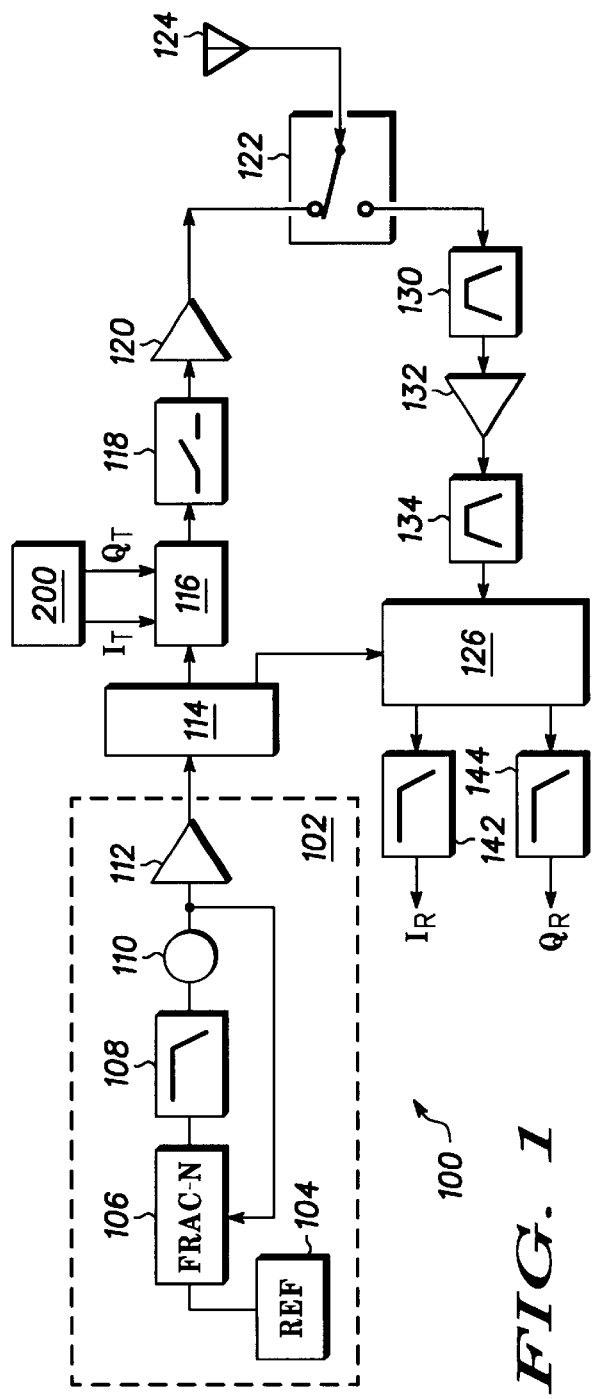
FIG. 1 is a block-schematic circuit diagram of a homodyne radio transceiver embodying the invention.

Referring now to FIG. 1, a homodyne radio transceiver 100 includes a synthesizer 102, in which a reference signal from a reference signal generator 104 is divided in a fractional-N divider 106 whose output signal is passed through a low pass filter 108 to control a voltage controlled oscillator (VCO) 110. The output of the VCO 110 is applied through an amplifier 112 to produce the synthesizer output. The VCO output is also fed back to the fractional-N divider 106. The synthesizer output is applied to power splitter 114, one of whose outputs is applied as a carrier signal to an I/Q modulator 116, which receives I and Q (i.e., in-phase and quadrature-phase respectively) signal inputs ($I_T$ and $Q_T$ respectively) from control circuitry 200, which will be described in greater detail below. The output of the I/Q modulator 116 is applied to an SPDT switch 118. The output from the switch 118 is applied to an RF power amplifier 120, whose output is applied (via a transmit/receive switch 122) to an antenna 124 for transmission.

Another output of the power splitter 114 is applied as a local oscillator signal to an I/Q demodulator 126.

For reception, the antenna 124 is connected (via the transmit/receive switch 122) through a band-pass filter 130, a low noise amplifier 132 and a band-pass filter 134 to an input of the I/Q demodulator 126. The demodulator 126 produces two outputs, which are applied through respective low-pass filters 142 and 144, to produce recovered I and Q received signals $I_R$ and $Q_R$ respectively.

Figure 2:
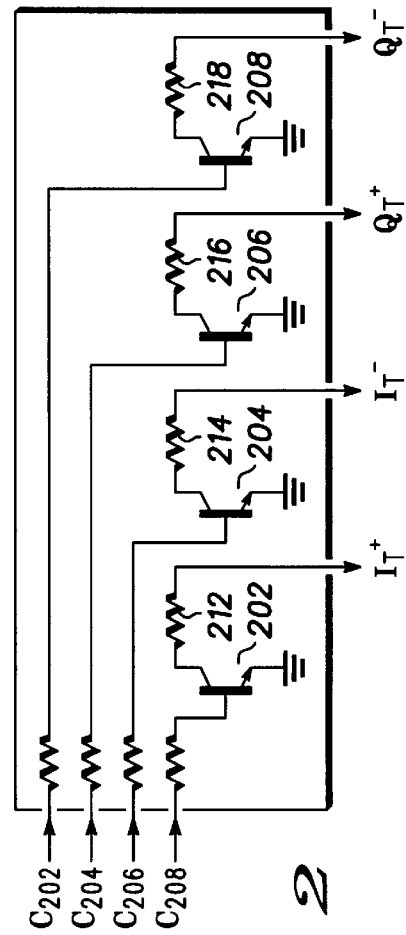
FIG. 2 is a symbolic circuit diagram of a control circuit used in the transceiver of FIG. 1.

Referring now also to FIG. 2, the control circuitry 200 produces the $I_T$ and $Q_T$ signals as differential signals on respective pairs of differential output lines $I_T^+$, $I_T^-$ and $Q_T^+$, $Q_T^-$ which respectively are input lines to the modulator 116. The control circuitry 200 has four bipolar npn transistors 202, 204, 206 and 208 which have their base electrodes connected respectively to differential input lines $C_{202}$, $C_{204}$, $C_{206}$ and $C_{208}$ through respective resistors. The collector electrodes of the transistors 202, 204, 206 and 208 are connected respectively to the output lines $I_T^+$, $I_T^-$ and $Q_T^+$, $Q_T^-$ via resistors 212, 214, 216 and 218. The emitter electrodes of the transistors 202, 204, 206 and 208 are connected to earth.

In use of the transceiver 100, the I/Q modulator 116 receives a carrier signal from the synthesizer 102. The control circuitry 200 provides differential $I_T$ and $Q_T$ input signals to the I/Q modulator 116. The I/Q modulated signal (having a carrier frequency $f_0$) which can have one of four selected phase states according to the applied modulation signals is passed on to the SPDT switch 118 which is used to create pulses for transmission. The pulses from the SPDT switch 118 enter the RF power amplifier 120, from which they are transmitted out (through the transmit/receive switch 122) at the antenna 124.

A received signal enters the radio transceiver 100 through the antenna 124 and is routed by way of the transmit/receive switch 122 to the receiver section of the transceiver. The received signal is band limited by the band-pass filter 130 and amplified by the low noise amplifier 132. The signal is then filtered again by the band-pass filter 134, and applied to the I/Q demodulator 126. The local oscillator signal for the I/Q demodulator 126 is provided by the output of the power splitter 114. The I and Q demodulated output signals of the I/Q demodulator 126 are then low-pass filtered by the respective low-pass filters 142 and 144 to produce recovered I and Q received signals $I_R$ and $Q_R$, which are passed to logic circuitry (not shown) of the transceiver.

As mentioned above, in order to minimise feedthrough of the carrier signal from the I/Q modulator 116 during reception of a received signal, the control signals are applied to the four control lines $C_{202}$, $C_{204}$, $C_{206}$ and $C_{208}$ to control the conductivity of the transistors 202, 204, 206 and 208 which are connected in open-collector configuration, so as to present high impedances to the respective inputs of the modulator 116.

It will be understood that a bias voltage on each of the output lines $I_T^+$, $I_T^-$, $Q_T^+$ and $Q_T^-$ is created by pull-up resistors (not shown) and internal bias circuitry (also not shown). In reception mode, all four control lines are held low, so that all of the transistors are off (thus presenting a high impedance to the modulator inputs), and the internal bias circuitry is undisturbed. This condition provides the best carrier suppression.

In transmission mode, one of the control lines is asserted high, which pulls low the appropriate output line ($I_T^+$, $I_T^-$, $Q_T^+$ or $Q_T^-$) and creates an intentional imbalance between the lines of the relevant differential pair ($I_T^+$ and $I_T^-$, or $Q_T^+$ and $Q_T^-$), which provides a constant-phase carrier. By appropriate selection of the values of the collector resistors (212, 214, 216 and 218), four quadrature phases can be obtained by activating respective ones of the control lines.

By combining DC coupling with a high-impedance state, accurate and stable phase control of the transmitted signal is possible, whilst maintaining low carrier leakage when necessary, especially during reception mode. In the transmission mode, the phase control voltages are DC-coupled to the I and Q inputs of the modulator, thus generating a constant-phase transmitted signal of the selected phase. When the transceiver is switched to reception mode, a high impedance is presented to the I and Q inputs of the I/Q modulator 116 and these inputs are virtually disconnected, leaving the internal DC bias of the I/Q modulator 116 undisturbed and thereby providing optimal carrier suppression during reception mode.

It will be understood that in the circuit and method for reducing carrier frequency transmission in a radio transceiver described above, by controlling the states of the I and Q inputs to the I/Q modulator during reception mode in the manner described, optimal carrier suppression from the I/Q modulator can be obtained during reception mode. A radio transceiver utilizing this novel and beneficial approach may use existing commercially available integrated circuits without any additional synthesizers, firmware, or additional high-cost hardware.

It will also be appreciated that although the invention has been described above in the context of a homodyne receiver, the invention could also be applied to a heterodyne transceiver.

What is claimed is:

1. A circuit for reducing unwanted carrier frequency transmission in a radio transceiver having transmission and reception modes, the circuit comprising:

modulator means having a carrier signal input for receiving a carrier signal and modulation signal inputs for receiving modulation signals for modulation on the carrier signal to produce a modulated carrier transmission signal for transmission in the transmission mode;

demodulator means for receiving a modulated carrier reception signal in the reception mode to recover therefrom signals modulated thereon; and control means for applying to the modulator signal inputs of the modulator means signals for modulation on the carrier during the transmission mode and for presenting to the modulation signal inputs of the modulator means high impedances during the reception mode whereby carrier signal transmission during the reception mode is reduced.

2. The circuit as claimed in claim 1 which additionally comprises a carrier frequency synthesizer having outputs connected respectively to the modulator means and the demodulator means.

3. The circuit as claimed in claim 1 wherein the modulator means and the control means are such that the modulation signals produced by the control means are phase control signals which are d.c. coupled to the modulator means.

4. The circuit as claimed in claim 3, wherein the control means is such as to provide to the modulator means during the transmission mode signals for modulation on the carrier which are in-phase and quadrature phase signals.

5. The circuit as claimed in claim 4, wherein the modulation signal inputs comprise two pairs of inputs and the control means is such that differential phase modulation signals are applicable via the modulation signal inputs of each pair.

6. The circuit as claimed in claim 5 wherein the modulator means comprises means for internally biasing the modulation signal inputs whereby the carrier signal is suppressed with no modulation signal applied.

7. The circuit as claimed in claim 6 wherein the control means and the modulator means are such as to provide that during the reception mode the carrier from the modulator means is substantially nulled.

8. The circuit as claimed in claim 4, wherein the modulation signal inputs to the modulator means from the control means comprise two pairs of inputs, differential modulation signals being applicable via the inputs of each pair to set the phase of the transmitted signal during the transmission mode to be one of four phase states.

9. The circuit as claimed in claim 4, wherein the control means comprises outputs for connection to the modulation signal inputs of the modulator means; and high impedance transistor means which can be selectively made conducting during the transmission mode to present applied phase controlling modulation signals to the required modulation signal inputs and which can be in a high impedance state during the reception mode to present a high impedance to the modulation signal inputs.

10. The circuit as claimed in claim 9, wherein the transistor means comprises bipolar transistors each connected to a respective modulation signal input of the modulator.

11. The circuit as claimed in claim 3 wherein the modulator means comprises means for internally biasing the modulation signal inputs whereby the carrier signal is suppressed with no modulation signal applied.

12. The circuit as claimed in claim 1 wherein the modulation means and the control means are such as to provide that during t he reception mode the carrier from the modulator means is substantially nulled.

13. The circuit as claimed in claim 1, wherein the control means comprises semiconductor switching devices which can be switched between a conducting state and a high impedance state.

14. The circuit as claimed in claim 1, wherein the control means comprises outputs for connection to the modulation signal inputs of the modulator means; and high impedance transistor means which can be selectively made conducting during the transmission mode to present applied modulation signals to the selected modulation signal inputs and which can be in a high impedance state during the reception mode to present a high impedance to the modulation signal inputs of the modulator means.

15. The circuit as claimed in claim 1, wherein the transceiver is a homodyne transceiver for use in a portable or mobile radio communications device.

16. A method for reducing carrier frequency transmission in a radio transceiver having a transmission mode and a reception mode, the method comprising:

providing modulator means and applying as inputs to the modulator means during the transmission mode a carrier signal and modulation signals for modulation on the carrier signal to produce a modulated carrier transmission signal for transmission;

providing demodulator means which during the reception mode receives a modulated carrier reception signal and recovers therefrom signals modulated thereon; and providing control means which applies to the modulator means input modulation signals for modulation on the carrier signal during the transmission mode and which presents to input terminals of the modulator means high impedances during the reception mode whereby transmission of the carrier signal during the reception mode is reduced.

17. The method as claimed in claim 16 wherein the carrier signal is generated by a carrier frequency synthesizer having outputs connected respectively to the modulator means and the demodulator means.

18. The method as claimed in claim 16 wherein the modulation signals are phase control signals which are d.c. coupled from the control means to the modulator means.

19. The method as claimed in claim 16, wherein the control means comprises:

outputs for connection to the inputs of the modulator means; and high impedance transistor means, the inputs of the modulator means being connected to the outputs of the control means and receiving the signals for modulation on the carrier during transmission, and the high impedance transistor means being coupled to the inputs of the modulator means to present a high impedance thereto during reception.

20. The method of claim 16 wherein the modulation signal inputs are internally biased by the modulator means whereby the carrier is suppressed with no modulation signal applied.

21. The method as claimed in claim 20, wherein the carrier from the modulator means is substantially nulled during the reception mode.

22. The method as claimed in claim 20, wherein the modulation signals received by the modulator means from the control means for modulation on the carrier during the transmission mode are in-phase and quadrature phase signals, wherein the in-phase and quadrature phase input signals applied to the modulator means are applied as pairs of differential inputs.

* * * * *